United States Patent [19]

Potzas

[11] Patent Number: 4,620,825
[45] Date of Patent: Nov. 4, 1986

[54] PULL-TYPE BLIND-RIVETING ASSEMBLIES

[75] Inventor: Peter Potzas, Buseck, Fed. Rep. of Germany

[73] Assignee: USM Corporation, Farmington, Conn.

[21] Appl. No.: 674,976

[22] Filed: Nov. 26, 1984

[30] Foreign Application Priority Data

Dec. 3, 1983 [DE] Fed. Rep. of Germany ....... 3343786

[51] Int. Cl.⁴ .............................................. F16B 19/10
[52] U.S. Cl. ........................................ 411/34; 411/40; 411/43; 411/44; 411/70
[58] Field of Search ............... 411/43, 70, 56, 33, 411/34, 39, 40, 44

[56] References Cited

U.S. PATENT DOCUMENTS

| 1,648,420 | 11/1927 | Ogden et al. | 411/52 |
| 2,536,353 | 1/1951 | Cooper | 411/70 |
| 3,017,799 | 1/1962 | Lemoine | 411/56 |
| 3,257,890 | 6/1966 | Kraemer | 411/43 |

FOREIGN PATENT DOCUMENTS

| 71407 | 2/1983 | European Pat. Off. | 411/39 |
| 1237423 | 6/1960 | France | 411/43 |
| 106169 | 5/1917 | United Kingdom | 411/43 |
| 504928 | of 1938 | United Kingdom | 411/44 |
| 786997 | 11/1957 | United Kingdom | 411/43 |
| 2054082 | 2/1981 | United Kingdom | 411/43 |

Primary Examiner—Richard E. Moore
Assistant Examiner—Rodney M. Lindsey
Attorney, Agent, or Firm—Alan N. McCartney

[57] ABSTRACT

A split-setting pull-type blind-riveting assembly comprising a hollow rivet and a mandrel. The underside of the mandrel head is frusto-conical and terminates at flat surfaces normal to the mandrel stem. A portion of the mandrel stem adjoining said plane is squared off so that its corners deform the rivet shank before the underside of the mandrel head splits it into petals. Reliable splitting of the rivet shank into uniform petals is thereby reliably achieved.

3 Claims, 4 Drawing Figures

U.S. Patent
Nov. 4, 1986
4,620,825
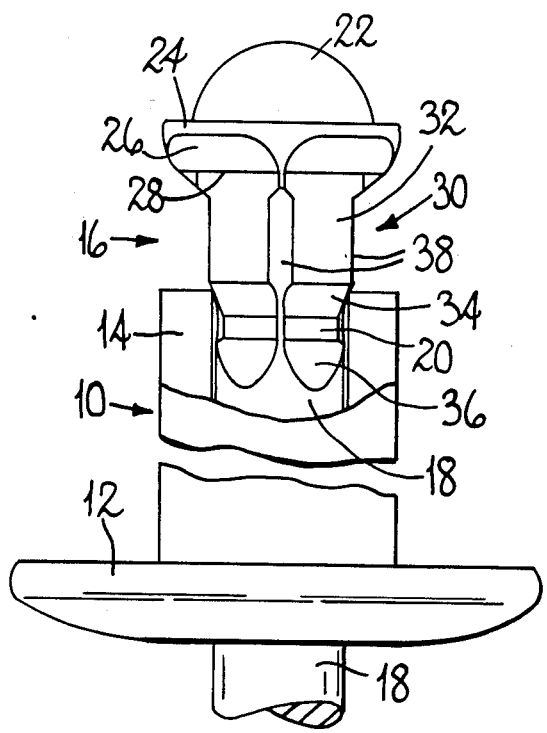
Fig_1
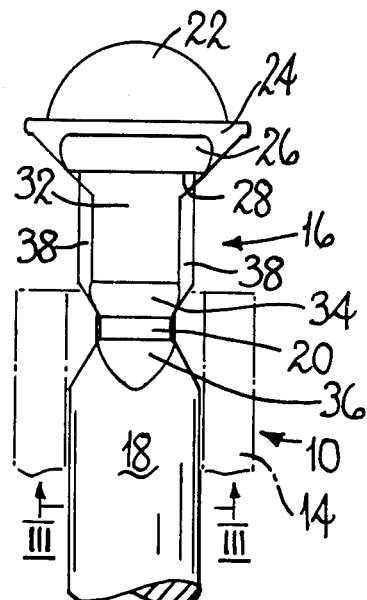
Fig_2
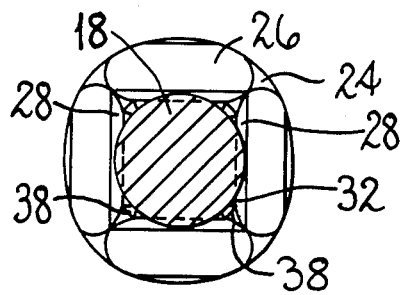
Fig_3
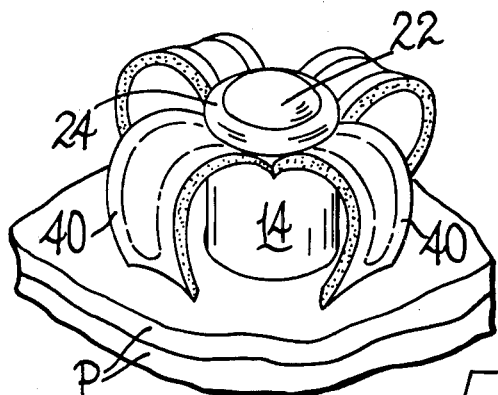
Fig_4

PULL-TYPE BLIND-RIVETING ASSEMBLIES

BACKGROUND OF THE INVENTION

1. Field of the Invention

This invention is concerned with pull-type blind-riveting assemblies.

2. Statement Of The Prior Art

Blind rivet assemblies may comprise a hollow rivet and a mandrel which includes a head and a cylindrical pulling portion, the mandrel having a pyramidal under-surface which provides radially disposed ridges to cause the tail end of the rivet to split into petals when the mandrel head is pulled into it on setting the rivet. Split-setting blind-riveting assemblies are of two kinds, viz. those in which the rivet barrel has longitudinal lines of weakness where it will split into petals when a mandrel head is pulled into it and those where the rivet barrel has no such lines of weakness but splitting is induced by radially disposed ridges on the under-surface of the mandrel head. Such ridges are usually provided by the edges of a three, four or five sided pyramidal configuration of such surface, the pyramidal configuration extending substantially from the periphery of a mandrel head to a cylindrical portion of the mandrel stem.

It is potentially more economical to manufacture the latter type of assembly because the process is less complicated than that required to provide lines of weakness along the rivet shank. However, it is desirable that the effect of the ridges on the under-surface of the mandrel head is to split the rivet shank evenly into the desired number of petals, i.e. four where the under-surface of a mandrel head is part of a square pyramid, and experience has shown that to ensure such a result requires the rivet shank wall to be of uniform thickness within very close limits of the manufacturing tolerance. Where, for example, the rivet bore is eccentric to a small degree outside such tolerance, the shank may split along three lines but not along, or only a short way along, the fourth. The maintenance of the necessary close manufacturing tolerance for the rivet to ensure uniform splitting has proved costly.

An attempt to meet the foregoing problem has been made in the art where a mandrel for this purpose is characterized in that the under-surface of the mandrel head meets a cylindrical portion of the stem at a plane normal to the axis of the stem with the result that at least at each corner of the pyramidal surface the mandrel head presents a flat shoulder portion normal to the mandrel stem. While such a mandrel led to a substantial improvement in the reliability of rivet setting, the problem of irregular setting still remained in an unacceptably high proportion of rivet settings.

SUMMARY OF THE INVENTION

It is accordingly the object of this invention to improve yet further the reliability in split-setting pull-type blind riveting of a mandrel intended to split the rivet shank evenly into uniform petals without becoming involved in unduly stringent manufacturing tolerances.

The foregoing object is achieved in accordance with the invention in that the under-surface of the mandrel head terminates at a plane normal to the axis of the stem where it joins a trailing portion of the mandrel stem which is of square cross-section symmetrically disposed within said plane, the length of each side of said cross-section being less than the diameter of the cylindrical pulling portion of the mandrel and the diagonals greater, said trailing portion thus providing edges which project beyond the periphery of said pulling portion of the mandrel stem and begin to deform the tail end of the rivet in a rivet-setting operation before the pyramidal under-surface of the mandrel head reaches it.

Preferably, in an assembly as set out in the last preceding paragraph, the axial length of the trailing portion of square cross-section of the mandrel stem is not less than the diameter of the said cylindrical portion. Preferably also between said trailing portion and said cylindrical portion, the mandrel stem is reduced in cross-section where it will break in a rivet-setting operation. The corners of the trailing portion may be bevelled or rounded and the periphery of the mandrel head a slightly squared-off circle with its corners in alignment with the faces of the trailing portion.

With assemblies in accordance with the invention it has been observed that reliable splitting of the rivet shank into evenly disposed petals has occurred when the bore of the rivet has been eccentric to the outer surface of the shank to an extent outside the stringent manufacturing tolerance that would have ensured such setting with a conventional mandrel in which the pyramidal surface under the head runs down to meet the mandrel stem, or even in the case where such surface meets a cylindrical portion of the mandrel stem at a plane normal to its axis. A rivet assembly in accordance with the invention is thus more economical to manufacture than is the case with known split-setting blind-riveting assemblies, and sets more reliably.

BRIEF DESCRIPTION OF THE DRAWINGS

FIGS. 1 and 2 represent the mandrel of the assembly as seen from two difference directions at angles of 45° to each other;

FIG. 3 is a view of the mandrel of the assembly looking along its stem towards its head showing the under-surface of its head, as seen on the line III—III of FIG. 2; and FIG. 4 represents a set rivet.

DESCRIPTION OF THE PREFERRED EMBODIMENTS

Referring to the drawings, the assembly comprises a hollow aluminium alloy rivet 10 having a head flange 12 and a shank 14 of uniform wall thickness without any longitudinal lines of weakness.

The exemplary assembly also comprises a steel mandrel 16 having stem 18 with a cylindrical pulling portion with a neck 20 at which it will break in the course of rivet setting and a head 22. The head 22 has a slightly squared-off, near circular periphery 24 with a frusto-pyramidal under-surface 26 which merges with the periphery of the head. The included angles between opposite sides of the pyramidal under-surface of the mandrel head in the drawings is 80°. The difference between the "diagonals" of the head and the minimum "diameter" is about 0.26 mm (i.e. 5.5% of a nominal 4.70 mm diameter head). The "corners" of the periphery are in alignment with the corners of the pyramidal under-surface. The under-surface 26 of the head terminates at a plane 28 normal to the axis of the stem with the result that the head presents flat shoulders 28 normal to the axis of the mandrel adjoining the faces of the pyramid. Symmetrically disposed with respect to these faces and surrounded by the shoulders 28 is a trailing portion 30 of the mandrel stem. The portion 30 is of square cross-section with four faces 32 each extending axially from the shoulders 28 by a distance of not less than the diameter of the pulling portion of the stem 18. Between the portions 18 and 30 of the stem is the break neck 20, which is of square cross-section with flat inclined faces 34 adjoining the faces 32 and flat inclined faces 36 adjoining the cylindrical pulling portion of the stem 18.

The foregoing shape is preferably imposed upon the mandrel during manufacture from cylindrical wire by swagging the trailing portion 30 of the stem 18 at the same time as the break neck 20 is formed, between four dies which simultaneously approach the wire along radii at 90° to each other. Thus the metal of the wire is reduced in width to form the four faces 32 and swells out to form the corners of a square, with the result that the corners are rounded off to give the appearance of bevels 38, with opposite corners spaced more widely apart than the diameter of the stem 18. In the case of the mandrel of this exemplary assembly, with a pulling stem of diameter 2.7 mm, the flat sides of the trailing portion are 2.4 mm apart and the diagonals of the cross-section 3.00 mm.

In the setting of a rivet in plates P (FIG. 4), the leading ends of the bevels 38, that is to say the corners of the trailing portion 30, first deform the rivet shank, tending to square it and by stretching the metal along the four lines where it is engaged by said corners, initiating splitting of the rivet shank into uniform petals 40 before the formation of the petals is completed by the underside of the mandrel head.

I claim:

1. A pull-type blind-riveting assembly comprising a hollow rivet and a mandrel which includes a head and a cylindrical pulling portion, the mandrel head having a square pyramidal under-surface which provides radial ridges to cause the tail end of the rivet to split into petals when the mandrel head is pulled into it on setting the rivet, characterized in that the under-surface of the mandrel head terminates at a plane normal to the axis of the stem where it joins a trailing portion of the mandrel stem which is of square cross-section symmetrically disposed within said plane, the length of each side of said cross-section being less than the diameter of the cylindrical pulling portion of the mandrel and the diagonals across said cross section being greater, said square cross section of said trailing portion thus providing diagonally opposed edges which project beyond the periphery of said pulling portion of the mandrel stem and begin to deform the tail end of the rivet into a squared configuration in a rivet-setting operation before the pyramidal under-surface of the mandrel head reaches it.

2. An assembly according to claim 1 further characterized in that the axial length of the trailing portion of square cross-section of the mandrel stem is not less than the diameter of the said cylindrical pulling portion.

3. An assembly according to claim 2 further characterized in that between said trailing portion and said cylindrical portion, the mandrel stem is reduced in cross-section where it will break in a rivet-setting operation.

* * * * *